United States Patent [19]
Fujino

[11] Patent Number: 5,372,233
[45] Date of Patent: Dec. 13, 1994

[54] CONVEYING METHOD AND A CONVEYOR CONTROL DEVICE

[75] Inventor: Noboru Fujino, Tokyo, Japan

[73] Assignee: Kabushiki Kaisha Shinkawa, Tokyo, Japan

[21] Appl. No.: 111,635

[22] Filed: Aug. 25, 1993

[30] Foreign Application Priority Data

Sep. 2, 1992 [JP] Japan .................. 4-257566

[51] Int. Cl.$^5$ .............................. B65G 43/00
[52] U.S. Cl. .................. 198/341; 198/346.2; 198/358
[58] Field of Search ......... 198/341, 346.2, 349.8, 198/358, 370, 571

[56] References Cited

U.S. PATENT DOCUMENTS

| | | | |
|---|---|---|---|
| 3,429,416 | 2/1969 | Provost et al. | 198/358 X |
| 4,852,717 | 8/1989 | Ross et al. | 198/460 X |
| 4,921,092 | 5/1990 | Crawford et al. | 198/460 |
| 5,203,443 | 4/1993 | Toriumi et al. | 198/346.2 X |

FOREIGN PATENT DOCUMENTS

| | | | |
|---|---|---|---|
| 3-158317 | 7/1991 | Japan | B65G 43/08 |
| 0649547 | 2/1979 | U.S.S.R. | 198/341 |

*Primary Examiner*—Cheryl L. Gastineau
*Attorney, Agent, or Firm*—Koda and Androlia

[57] ABSTRACT

In a conveyor system including a plurality of processing devices such as wire bonders that are lined-up and supplied with workpieces via a plurality of individually operated conveyors that are aligned linearly, when one (or more) processing device is ready to perform its processing such as bonding, a stopper installed in front of the processing device is raised to stop the conveyance of the workpiece, and when a sensor provided near the conveyor senses the conveyed workpiece, the conveyor is temporarily stopped and then rotated again for a fixed period of time or is slowed down in speed and then rotated for a fixed period of time or a fixed distance. Thus, a workpiece being conveyed is slowed down and therefore avoided from hitting the stopper at a high speed. Thus, the workpiece is prevented from being damaged at the front edge. Also, since the workpieces do not bounce back, they are stopped at the same stopping positions.

6 Claims, 5 Drawing Sheets

CONVEYING METHOD AND A CONVEYOR CONTROL DEVICE

BACKGROUND OF THE INVENTION

1. Field of the Invention

The present invention relates to a conveying method and a conveyor control device and more particularly to a conveying method and conveyor control device used in a conveying system that transfers workpieces such as lead frames, circuit boards, etc. in, for example, a semiconductor assembly line.

2. Prior Art

The Japanese Patent Application Laid-Open (Kokai) No. 3-158317 discloses a conveyor system used in a semiconductor assembly line. In this system, a plurality of processing devices of the same type (that are all wire bonders) are installed, and workpieces supplied to each one of the processing devices and the workpieces discharged from each one of the processing devices are conveyed by a single conveyor line that is commonly used to those processing devices.

In this conveyor system, as shown in FIG. 5, pairs of conveyors $15A_1$ and $15A_2$, $15B_1$ and $15B_2$, ... are lined-up and installed in front of each one of a plurality of wire bonders 1A through 1D, and a guide device 3 is provided along the conveyors. As typically shown in the wire bonder 1C, each wire bonder includes a supply device 5 and a discharge device 8; and one of the two conveyors, which is $15C_1$, is installed to correspond to (or work with) the supply device 5, and the other conveyor, which is $15C_2$, is installed to correspond to (or work with) the discharge devices 8.

The conveyors $15A_1$, $15A_2$, $15B_1$, $15B_2$, ... are respectively actuated by motors $16A_1$, $16A_2$, $16B_2$, $16B_2$. . . . In addition, sensors $17A_1$, $17A_2$, $17B_1$, $17B_2$, ... which detect the passage of the workpieces are installed above or below the respective conveyors $15A_1$, $15A_2$, $15B_1$, $15B_2$, ... Furthermore, stoppers 18A, 18B, 18C and 18D are installed near the conveyors $15A_1$, $15B_1$, $15C_1$ and $15D_1$ which are provided in front of the supply devices 5. The stoppers move up and down, and when they move up, they can stop the workpieces to position them on the conveyors.

A workpiece supply magazine 9 and a workpiece storage magazine 10 are installed on either end of the conveyor system.

When, for example, the wire bonder 1B requires a supply of a workpiece (or when the bonder 1B is actuated to perform the bonding), the conveyor $15B_1$ and all the conveyors between the conveyor $15B_1$ and the supply magazine 9 are actuated. In particular, the motors $16A_1$, $16A_2$ and $16B_1$ are actuated, and the conveyors $15A_1$, $15A_2$ and $15B_1$ in this case, are driven, and a workpiece is supplied to the conveyor $15A_1$ from the supply magazine 9 so that the workpiece is forwarded to the bonder 1B.

When the sensor $17A_2$ detects the workpiece, the stopper 18B is moved upward, and when the sensor $17B_1$ detects the conveyed workpiece, the conveyor $15B_1$ rotates for a fixed period of time and then stops. As a result, the workpiece sent onto the conveyor $15B_1$ is positioned by the stopper 18B in front of the supply device 5 of the bonder 1B and supplied into the wire bonder 1B by the supply device 5.

As seen from the above, when a workpiece is positioned by, for example, the stopper 18B, the motor $16B_1$ is actuated for a fixed period of time after the workpiece has been detected by the sensor $17B_1$, and then the conveyor $15B_1$ is stopped. In this case, since the speed of the conveyor $15B_1$ is high, the inertia of the workpiece causes the workpiece to hit the stopper 18B hard. If this happens, the workpiece, particularly its leading edge, may be damaged. Also, the workpieces may bounce back when they hit the stoppers. If this happens, the workpieces stop at different positions on the conveyors.

SUMMARY OF THE INVENTION

Accordingly, the object of the present invention is to solve the problems of the conveyor system of the prior art.

It is a primary object of the present invention to provide a conveying method and a conveyor control device that can avoid damages to the leading edges of workpieces and prevent the workpieces from bouncing back so that the workpieces can stop at the same position.

The method of the present invention is used in a conveyor system which comprises:

(a) a plurality of lined processing devices of the same type (such as bonding devices), and (b) a single conveyor line that is commonly used for the processing devices so that workpieces are supplied to and discharged from each one of the processing devices, the conveyor line consisting of a plurality of pairs of conveyors which are installed to correspond to each one of the processing devices, each one of the conveyors being individually controlled and equipped with (i) a stopper which moves up and down to position the workpieces, and (ii) a sensor which is installed on a workpiece supply side of the stopper to detect the workpieces, and the method is performed so that (1) if a workpiece is conveyed to one of the conveyors that corresponds to a processing device which requires the supply of a workpiece, the stopper in the conveyor is raised, and (2) when the sensor of the conveyor detects the workpiece, the conveyor is rotated for a fixed period of time after being temporarily stopped or is slowed down and then rotated for a fixed period of time or a fixed distance.

The conveyor control device of the present invention is used in a conveyor system which comprises:

(a) a plurality of lined processing devices of the same type (such as bonding devices), and (b) a single conveyor line that is commonly used for the processing devices so that workpieces are supplied to and discharged from each one of the processing devices, the conveyor line consisting of a plurality of pairs of conveyors which are installed to correspond to each one of the processing devices, each one of the conveyors being individually controlled and equipped with (i) a stopper which moves up and down to position the workpieces, and (ii) a sensor which is installed on a workpiece supply side of the stopper to detect the workpieces, and the control device works so that (1) if a workpiece is conveyed to one of the conveyors that corresponds to a processing device which requires the supply of a workpiece, the stopper in the conveyor is raised, and (2) when the sensor of the conveyor detects the workpiece, the conveyor is rotated for a fixed period of time after being temporarily stopped or is slowed down and then rotated for a fixed period of time or a fixed distance.

As seen from the above, when a workpiece is stopped by a raised stopper either one of the two actions occurs on the conveyor. One is that the corresponding conveyor is temporarily stopped and then again rotated after the workpiece has been detected by the sensor; and the other is that the conveyor is slowed down and then rotated for a fixed period of time or a fixed distance after the workpiece has been detected by the sensor.

Accordingly, the inertia of the workpiece is eliminated when the workpiece contacts the stopper. As a result, the impact of the workpiece hitting the stopper is weak. Thus, damage to the leading edge of the workpiece is prevented. Also, the workpiece is prevented from bouncing back, and the stopping positions of the workpieces are kept constant.

DETAILED DESCRIPTION OF THE INVENTION

Figure 5:
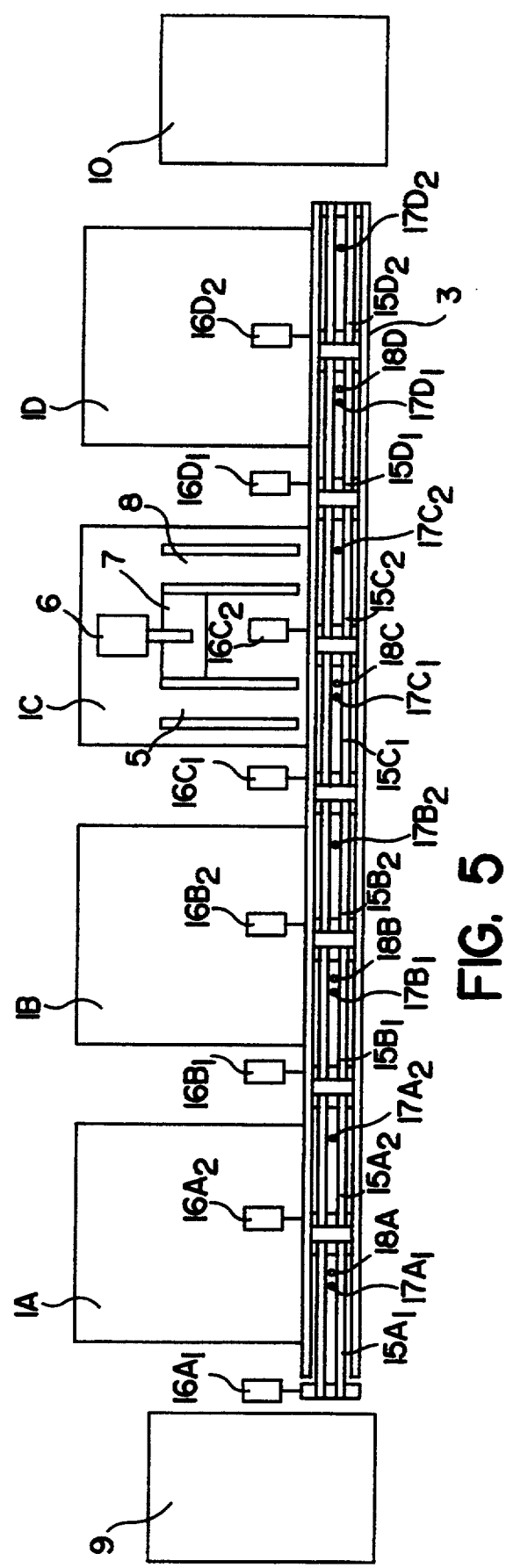
FIG. 5 is a top view of a conveyor device to which the method and device of the present invention is applied.

One embodiment of the present invention will be described with reference to FIG. 5.

In this description, any one of the wire bonders 1A through 1D (not necessarily four as shown in the Figure, more or less bonders or other processing device can be arranged) which requires a supply of workpieces will be referred to as a "supply-requiring wire bonder".

In addition, the conveyors $15A_1$, $15B_1$, $15C_1$ and $15D_1$ that correspond to supply devices 5 of the wire bonders 1A through 1D are called "supply conveyors", and any supply conveyor that corresponds to (or works with) a supply-requiring wire bonder will be referred to as the "corresponding conveyor". The conveyors $15A_2$, $15B_2$, $15C_2$ and $15D_2$ that correspond (or work with) discharge devices 8 are called "discharge conveyors". One supply conveyor and one discharge conveyor, such as the conveyor $15A_1$ and the conveyor $15A_2$, make a pair for each one of the processing devices 1A through 1D.

Moreover, the stopper and the sensor installed adjacent to the corresponding conveyor (among the stoppers 18A, 18B, 18C and 18D and sensors $17A_1$, $17B_1$, $17C_1$ and $17D_1$) will be referred to as the "corresponding stopper" and the "corresponding sensor", respectively.

The stoppers can make any movement to stop the conveyance of the workpiece. They can move up and down over the conveyors or in a horizontal direction over the conveyors. In addition, the motors $16A_1$, $16A_2$, $16B_1$, $16B_2$, . . . can be AC motors, servo motors, stepping motors, etc.

When there is a request for a workpiece from a supply requiring wire bonder, all of the conveyors from the supply magazine 9 up to the corresponding conveyor are rotated by the motors, which are AC motors in this embodiment, so that a workpiece supplied from the supply magazine 9 is conveyed to the corresponding conveyor, and the corresponding stopper is raised. When the corresponding sensor detects the workpiece, the corresponding conveyor stops temporarily and then again rotates for a fixed period of time.

More specifically, if the supply-requiring wire bonder, for example, is the bonder 1C, the conveyors $15A_1$, $15A_2$, $15B_1$, $15B_2$ and $15C_1$ are rotated, and the stopper 18C is raised so that it is ready to stop the conveyance of the workpiece.

When the sensor $17C_1$ detects the workpiece, the conveyor $15C_1$ stops temporarily and then again rotates for a fixed period of time so that the workpiece gently comes into contact with the stopper 18C and then stops.

The period of time the conveyor $15C_1$ is re-rotated after being stopped is determined by the distance between the sensor $17C_1$ and the stopper 18C and by the speed of the conveyor $15C_1$.

Thus, when the bonder 1C is the supply-requiring wire bonder, the conveyor $15C_1$ is temporarily stopped after the workpiece has been detected by the sensor $17C_1$ and then again caused to rotate. Accordingly, the inertia of the workpiece is eliminated before the workpiece comes into contact with the stopper 18C. As a result, the impact of the workpiece hitting the stopper 18C is weak, and the damage to the leading edge of the workpiece is prevented. In addition, the workpiece is prevented from bouncing back, and the stopping position of the workpiece can be the same for all the workpieces to be slopped.

Figure 1:
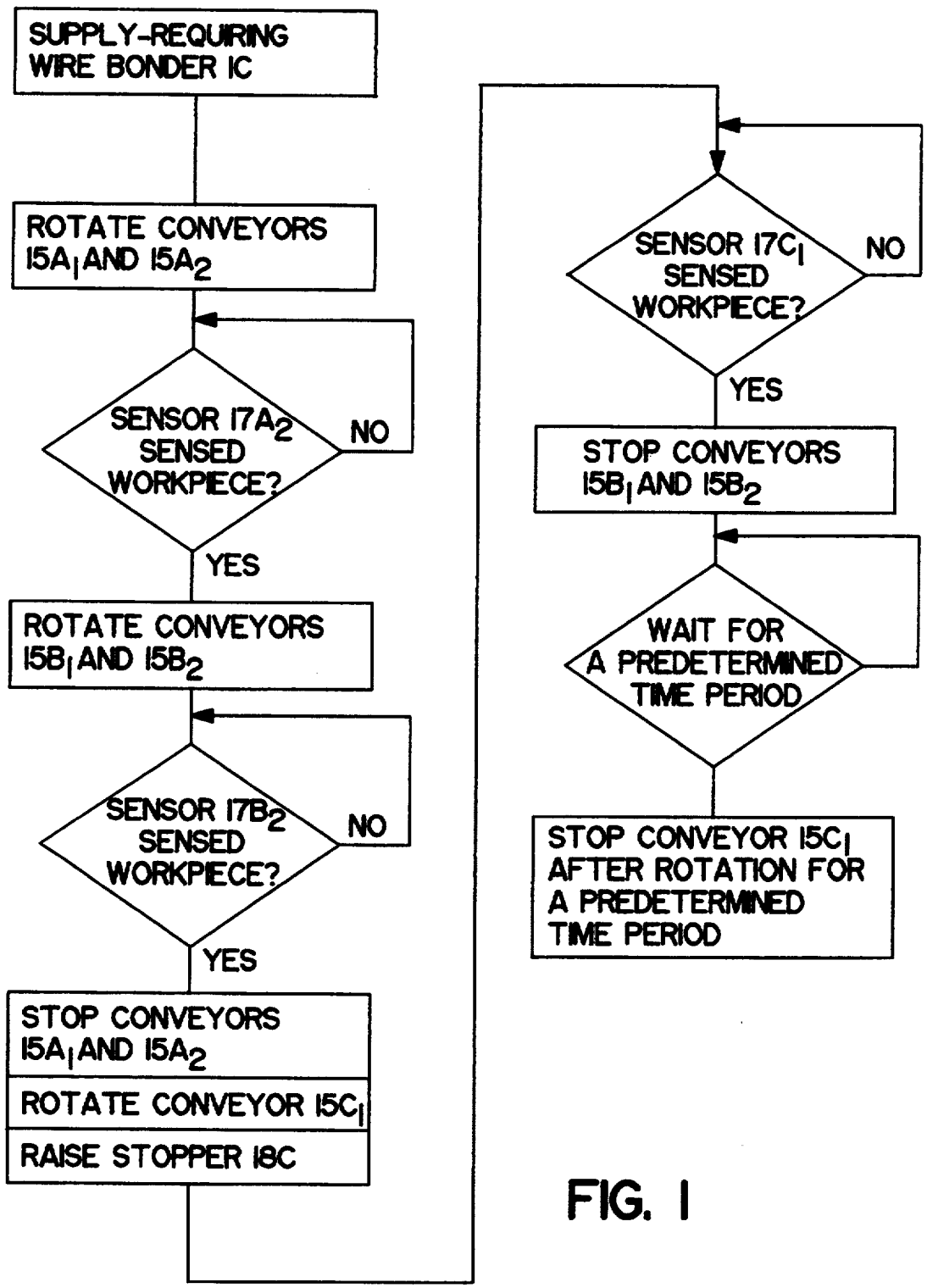
FIG. 1 is a flow chart illustrating one embodiment of the conveying method according to the present invention.

A more detailed description of the above-described embodiment will be given on the basis of FIG. 1 with reference to FIG. 5 as well:

(1) When there is a request for a workpiece from the wire bonder (the supply-requiring wire bonder) IC;

(2) The motors $16A_1$ and $16A_2$ are actuated so that the conveyors $15A_1$ and $15A_2$ rotate.

(3) When the sensor $17A_2$ detects the workpiece which has been supplied to the conveyor $15A_1$ from the supply magazine 9, the motors $16B_1$ and $16B_2$ are started;

(4) As a result, the conveyors $15B_1$ and $15B_2$ rotate.

(5) When the sensor $17B_2$ detects the workpiece;

(6) The rotation of the conveyors $15A_1$ and $15A_2$ is stopped, the motor $16C_1$ is actuated to rotate the conveyor $15C_1$, and the stopper 18C is raised so that it is ready to stop the workpiece.

(7) When the sensor $17C_1$ detects the workpiece;

(8) The conveyors $15B_1$, $15B_2$ and $15C_1$ are stopped.

(9) After a predetermined period of time has passed;

(10) The motor $16C_1$ is again started so that the conveyor $15C_1$ rotates for a predetermined period of time (as controlled by a timer) that can send the workpiece so as to come into contact with stopper 18C, and then the conveyor $15C_1$ stops.

Figure 2:
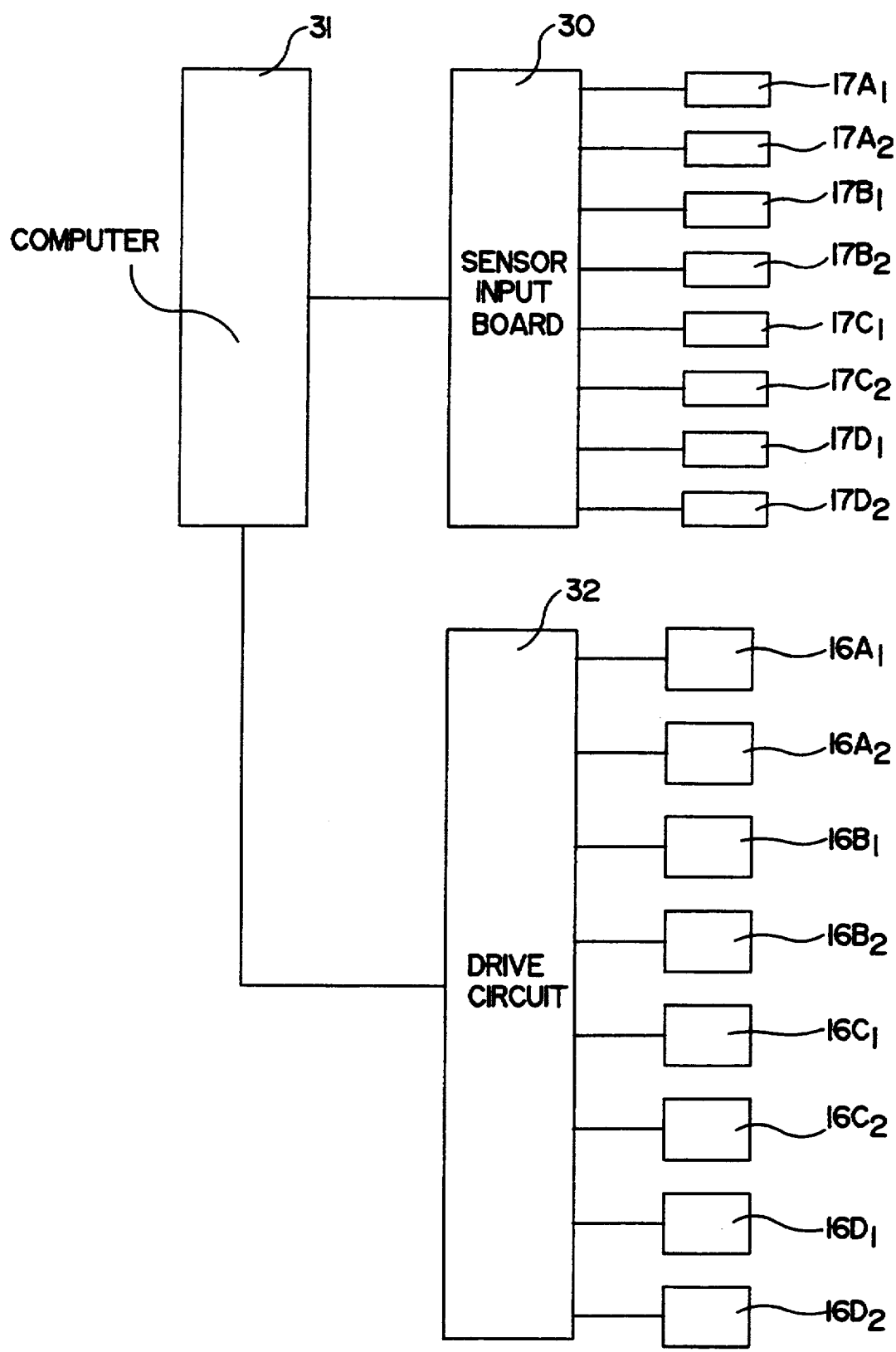
FIG. 2 is a block diagram of the control device used in the method of FIG. 1.

In the above operation, the detection signals of the sensors $17A_1$, $17A_2$, $17B_1$, $17B_2$, . . . and the drive control of the motors $16A_1$, $16A_2$, $16B_1$, $16B_2$, . . . are performed by the control device shown in FIG. 2. In particular, the output signals of the sensors $17A_1$, $17A_2$, $17B_1$, $17B_2$, . . . are inputted into a computer 31 via a sensor input board 30. The computer 3i controls the motors $16A_1$, $16A_2$, $16B_1$, $16B_2$, . . . via a drive circuit 32 in accordance with preprogrammed control command signals and the output signals of the sensors 17A$_1$, 17A$_2$, 17B$_1$, 17B$_2$, . . .

Another embodiment of the present invention will be described with reference to FIG. 5.

In this embodiment, the servo motors or stepping motors are used as the motors 16A$_1$, 16A$_2$, 16B$_1$, 16B$_2$, . . .

When there is a request for a workpiece from a supply-requiring wire bonder, all of the conveyors between the supply magazine 9 and the corresponding conveyor are caused to rotate, and the corresponding stopper is actuated as in the previous embodiment described above.

In this embodiment, however, when the corresponding sensor detects the workpiece, the rotation of the corresponding conveyor is slowed down, driven for a predetermined period of time or a predetermined distance at the slowed-down speed and then stopped.

For example, if the supply-requiring wire bonder is the bonder 1C, the conveyors 15A$_1$, 15A$_2$, 15B$_1$, 15B$_2$ and 15C$_1$ are caused to rotate, and the stopper 18C is raised, as in the previous embodiment. When the sensor 17C$_1$ detects the workpiece, the rotation of the conveyor 15C$_1$ is slowed down. The conveyor 15C$_1$ rotates for a predetermined period of time or a predetermined distance at the slowed-down speed and then stops its rotation so that the workpiece comes into contact with the stopper 18C and is stopped. The predetermined period of time and distance described above after the slow down is controlled by applying to the motor 16C$_1$ the number of pulses required to cause the conveyor 15C$_1$ to rotate by an amount that corresponds to the distance between the sensor 17C$_1$ and the stopper 18C.

An effect equal to that obtained in the previous embodiment is obtained by this method as well.

A further even more detailed description of the embodiment will be described below with reference to FIGS. 3 and 4 together with FIG. 5.

If the supply-requiring wire bonder is the bonder 1C, the process up to the detection of the workpiece by the sensor 17C$_1$ is executed in the same way as in the previous embodiment. In the previous embodiment, the conveyors 15B$_1$ and 15B$_2$ and the conveyor 15C$_1$ are stopped, and then the conveyor 15C$_1$ is started again when the workpiece is detected by the sensor 17C$_1$.

Figure 3:
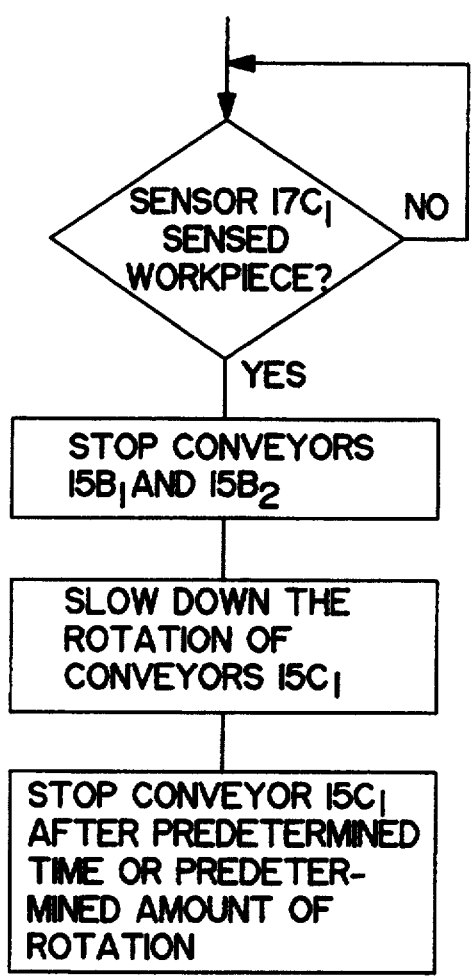
FIG. 3 is a flow chart illustrating another embodiment of the conveying method of the present invention.

In this embodiment, however, as shown in FIG. 3, only the conveyors 15B$_1$ and 15B$_2$ are stopped when the workpiece is detected by the sensor 17C$_1$, and the conveyor 15C$_1$ continues its movement. In other words, the motor 16C$_1$ is kept driven at a low speed so that the conveyor 15C$_1$ continues its rotation at the slowed-down speed.

Following this speed reduction, the motor 16C$_1$ is driven for a predetermined period of time or is caused to rotate by an amount corresponding to the distance between the sensor 17C$_1$ and the stopper 18C.

Figure 4:
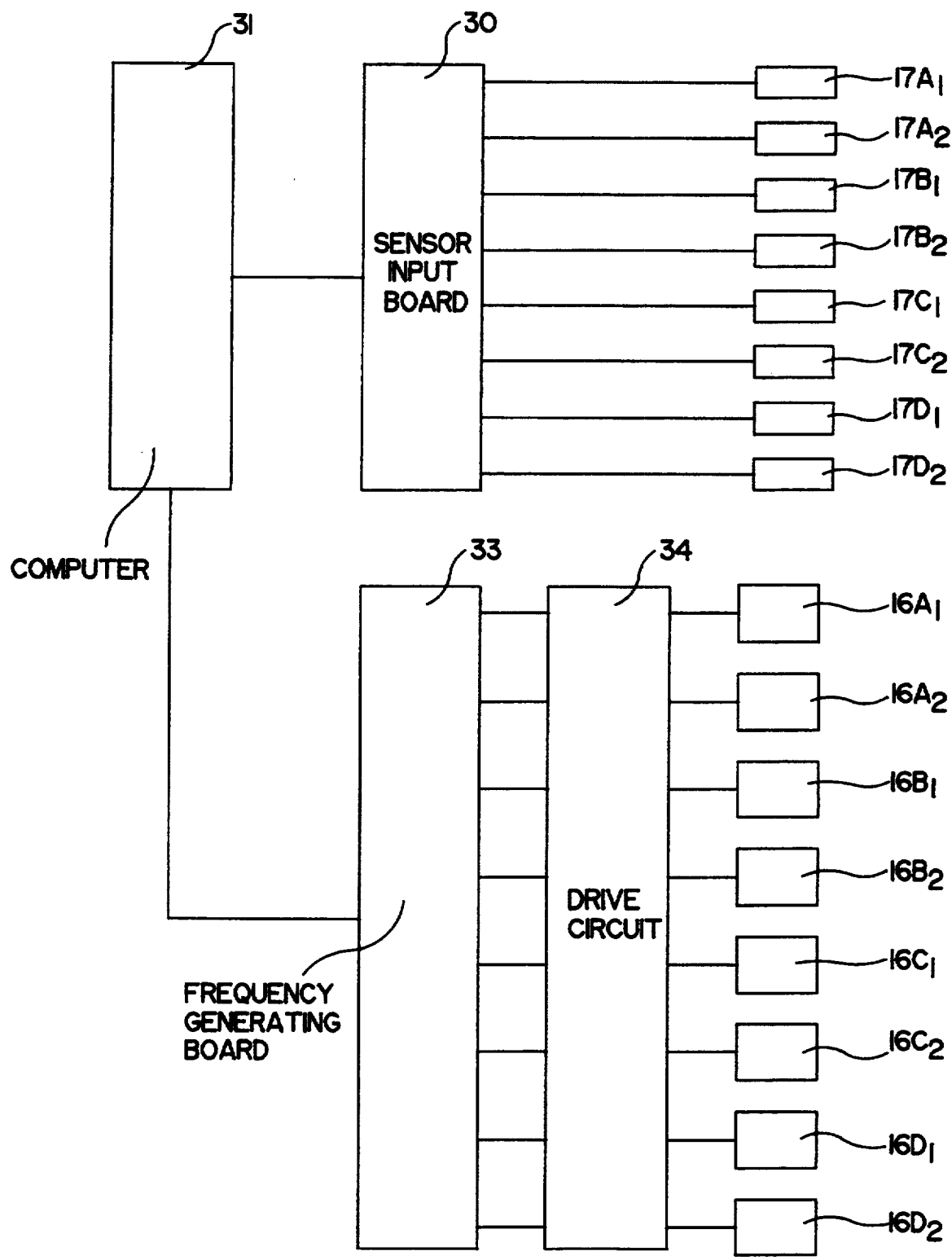
FIG. 4 is a block diagram of the control device used in the method of FIG. 3.

If the motor 16C$_1$ is actuated by an amount that corresponds to the distance between the sensor 17C$_1$ and the stopper 18C, the number of pulses, which is required to rotate the motor 16C$_1$ for the amount corresponding to the distance between the sensor 17C$_1$ and the stopper 18C, is inputted into a frequency generating board 33 through the computer 31 as shown in FIG. 4. The frequency generating board 33 then outputs the given pulse quantity to a drive circuit 34, so that the motor 16C$_1$ is actuated. In other words, the computer 31 inputs the pulse into the frequency generating board 33 in accordance with the preprogrammed control command signals and the output signals of the sensors 17A$_1$, 17A$_2$, 17B$_1$, 17B$_2$, . . . On the other hand, the frequency generating board 33 controls the motors 16A$_1$, 16A$_2$, 16B$_1$, 16B$_2$, . . . via the drive circuit 34.

As seen from the above, according to the present invention, when a workpiece is conveyed to a conveyor that is provided in front of a processing device (which is, for example, a wire bonder) that requires the workpiece for performing the processing (for example, wire bonding), a stopper provided for the conveyor is actuated so as to stop the workpiece. When a sensor for the conveyor detects the workpiece, the conveyor is temporarily stopped and then rotated again to send the workpiece to the stopper. When the workpiece is detected, the conveyor, in accordance with another embodiment, is slowed down and rotated at the slowed-down speed to send the workpiece to the stopper.

Accordingly, the workpiece does not hit the stopper at high speed; and as a result, the leading edge of the workpiece is not damaged. Also, since the workpiece is prevented from bouncing back on the conveyor, the stopping position of the workpiece can be stabilized.

I claim:

1. A conveyor method in a conveyor system which comprises:

a plurality of lined-up processing devices of a same type; and a single conveyor line that is commonly used for said plurality of processing devices so that workpieces are supplied to and discharged from each one of said processing devices, said conveyor line consisting of a plurality of conveyors which are installed to correspond to each one of said processing devices, and each one of said conveyor being individually controlled and equipped with a stopper which moves up and down to position said workpieces and with a sensor which is installed on a workpiece supply side of said stopper to detect the workpieces, and said method comprising the steps of:

moving said stopper for said conveyor that corresponds to a processing device which requires a supply of a workpiece up when said workpiece is conveyed to said conveyor, and rotating said conveyor for a fixed period of time after being temporarily stopped when said sensor for said conveyor detects said workpiece and then rotating said conveyor for a fixed period of time.

2. A conveyor control device used in a conveyor system which comprises:

a plurality of lined-up processing devices of a same type; and a single conveyor line that is commonly used for said plurality of processing devices so that workpieces are supplied to and discharged from each one of said processing devices, said conveyor line consisting of a plurality of conveyors which are installed to correspond to each one of said processing devices, and each one of said conveyors being individually controlled and equipped with a stopper which moves up and down to position said workpieces and with a sensor which is installed on a workpiece supply side of said stopper to detect the workpieces, and said method comprising the steps of:

moving said stopper for said conveyor that corresponds to a processing device which requires a supply of a workpiece up when said workpiece is conveyed to said conveyor, and rotating said conveyor for a fixed period of time after being temporarily stopped when said sensor for said conveyor detects said workpiece and then rotating said conveyor for a fixed period of time.

3. A conveying method used in a conveyor system which comprises:
- a plurality of lined-up processing devices; and
- a conveyor line that is commonly used for said plurality of processing devices so that workpieces are supplied to and discharged from each one of said processing devices, said conveyor line consisting of a plurality of pairs of conveyors so that each pair of conveyors are installed to work with each one of said processing devices, said each one of pairs of conveyors comprising a supply Conveyor and a discharge conveyors;
- motors provided so as to individually operate said supply conveyor and said discharge conveyor;
- sensors provided adjacent to said supply conveyor and said discharge conveyor so as to sense a movement of said workpiece; and
- a stopper for stopping said movement of said workpiece, said stopper being provided near said supply conveyor and on an upper stream side of said sensor;

said conveying method comprising:
- actuating said stopper so as to move to a position where said movement of said workpiece being conveyed is stopped;
- detecting by said sensor said movement of said workpiece being conveyed to sense said workpiece passing said sensor;
- stopping said conveyor conveying said workpiece; and
- re-rotating said conveyor after a predetermined period of time of said stopping so that said workpiece comes into contact with said stopper.

4. A conveying method used in a conveyor system which comprises:
- a plurality of lined-up processing devices; and
- a conveyor line that is commonly used for said plurality of processing devices so that workpieces are supplied to and discharged from each one of said processing devices, said conveyor line consisting of a plurality of pairs of conveyors so that each pair of conveyors are installed to work with each one of said processing devices, said each one of pairs of conveyors comprising a supply conveyor and a discharge conveyor;
- motors provided so as to individually operate said supply conveyor and said discharge conveyor;
- sensors provided adjacent to said supply conveyor and said discharge conveyor so as to sense a movement of said workpiece; and
- a stopper for stopping said movement of said workpiece, said stopper being provided near said supply conveyor and on an upper stream side of said sensor;

said conveying method comprising:
- actuating said stopper so as to move to a position where said movement of said workpiece being conveyed is stopped;
- detecting by said sensor said movement of said workpiece being conveyed to sense said workpiece passing said sensor; and
- slowing down a speed of said conveyor conveying said workpiece so that said workpiece gently comes into contact with said stopper.

5. A conveying method in a conveyor system which comprises:
- a plurality of lined-up processing devices of a same type; and
- a single conveyor line that is commonly used for said plurality of processing devices so that workpieces are supplied to and discharged from each one of said processing devices, aid conveyor line consisting of a plurality of conveyor which are installed to correspond to each one of said processing devices, and each one of said conveyors being individually controlled and equipped with a stopper which moves up and down to position said workpieces and with a sensor which is installed on a workpiece supply side of said stopper to detect the workpieces, and said method comprising the steps of:
- moving said stopper for a conveyor tat corresponds to a processing device which requires a supply of a workpiece up when said workpiece is conveyed to said conveyor, and rotating said conveyor for a fixed period of time after being slowed down when said sensor for said conveyor detects said workpiece, and the rotating said conveyor for a fixed distance.

6. A conveyor control device used in a conveyor system which comprises:
- a plurality of lined-up processing devices of a same type; and
- a single conveyor line that is commonly used for said plurality of processing devices so that workpieces are supplied to and discharged from each one of said processing devices, said conveyor line consisting of a plurality of conveyors which are installed to correspond to each one of said processing devices, and each one of said conveyors being individually controlled and equipped with a stopper which moves up and down to position said workpieces and with a sensor which is installed on a workpiece supply side of said stopper to detect the workpieces, and said control device is characterized in that:
- when said workpieces conveyed to one of said conveyors that corresponds to a processing device which requires a supply of a workpiece, said stopper for said conveyor is moved up and when said sensor for said conveyor detects said workpiece, said conveyor is rotated for a fixed period of time after being slowed down and then rotated for a fixed distance.

* * * * *